(12) United States Patent
Lin et al.

(10) Patent No.: US 7,085,328 B2
(45) Date of Patent: Aug. 1, 2006

(54) QAM RECEIVER HAVING JOINT GAIN, CARRIER RECOVERY AND EQUALIZATION ADAPTATION SYSTEM

(75) Inventors: Chia-Liang Lin, Union City, CA (US); Wen-Juh Kang, Sunnyvale, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 755 days.

(21) Appl. No.: 10/328,504

(22) Filed: Dec. 24, 2002

(65) Prior Publication Data

US 2004/0120422 A1 Jun. 24, 2004

(51) Int. Cl.
*H04L 5/12* (2006.01)
(52) U.S. Cl. .................................... 375/261
(58) Field of Classification Search ............... 375/261, 375/345, 354, 362, 371; 329/304–310
See application file for complete search history.

(56) References Cited

U.S. PATENT DOCUMENTS

| | | | | |
|---|---|---|---|---|
| 3,962,637 A | * | 6/1976 | Motley et al. | 375/232 |
| 4,253,184 A | * | 2/1981 | Gitlin et al. | 375/232 |
| 5,386,239 A | * | 1/1995 | Wang et al. | 348/472 |
| 5,555,534 A | * | 9/1996 | Maslak et al. | 367/135 |
| 5,754,591 A | * | 5/1998 | Samueli et al. | 375/235 |
| 6,819,514 B1 | * | 11/2004 | Behrens et al. | 360/65 |

* cited by examiner

*Primary Examiner*—Don N. Vo
(74) *Attorney, Agent, or Firm*—Daniel J. Bedell; Smith-Hill and Bedell (57) ABSTRACT

A quadrature amplitude modulation (QAM) receiver digitizes an analog QAM signal representing a transmitted sequence of complex elements to produce a digital waveform sequence representing amplitudes of successive samples of the QAM signal. The QAM receiver employs a digital signal processing (DSP) circuit to process the digital waveform sequence to produce a soft decision sequence of complex elements, each of value that is a higher resolution approximation of a value of a corresponding transmitted sequence element. A pair of slicers then convert each soft decision sequence element into a lower resolution hard decision sequence element matching the corresponding complex element of the transmitted sequence. In processing the digital waveform sequence, the DSP circuit provides quadrature demodulation with a demodulation phase angle controlled by a control data sequence $\theta_n$ provides a gain controlled by control data $g_n$ and provides equalization using a set of equalization filter coefficients, each $i^{th}$ filter coefficient being of value controlled by separate control data $f_i$. DSP circuit adjusts control data sequence $\theta_n$ and control data $g_n$ and $f_i$ in accordance with separate algorithms, but the algorithms all minimize the same cost function relative to the soft and hard decision sequences.

32 Claims, 4 Drawing Sheets

QAM RECEIVER HAVING JOINT GAIN, CARRIER RECOVERY AND EQUALIZATION ADAPTATION SYSTEM

BACKGROUND OF THE INVENTION

1. Field of the Invention

The present invention relates in general to quadrature amplitude modulation (QAM) receivers, and in particular to an apparatus for providing gain, carrier recovery and equalization for a QAM receiver.

2. Description of Related Art

Figure 1:
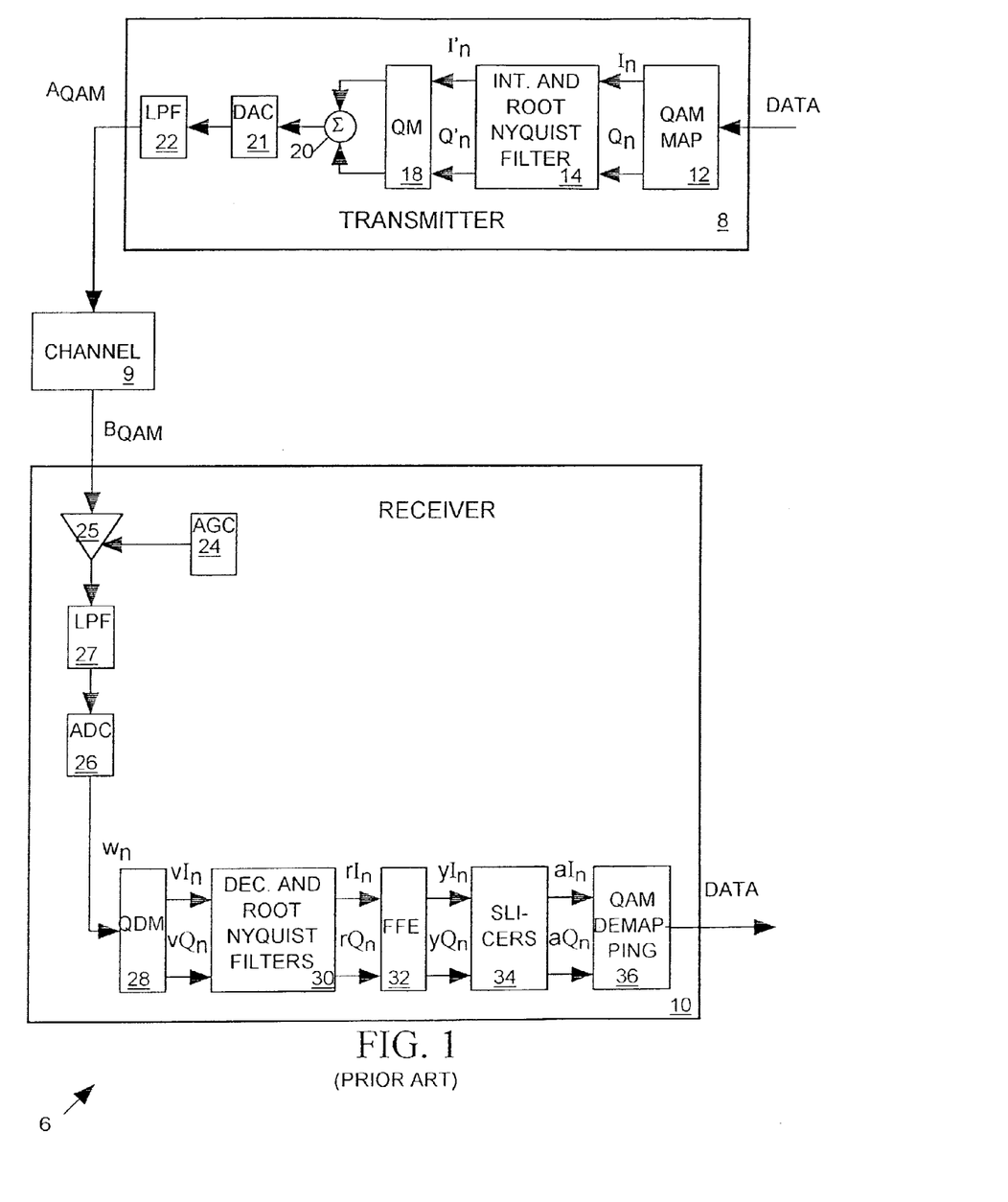
FIG. 1 illustrates a prior art quadrature amplitude modulation (QAM) communication system in block diagram form.

FIG. 1 depicts a prior art quadrature amplitude modulation (QAM) communication system 6 including a transmitter 8 for converting an input bit sequence (DATA) into a QAM modulated analog signal $A_{QAM}$, a communication channel 9 for delivering the $A_{QAM}$ signal as an input signal $B_{QAM}$ to a receiver 10. The $B_{QAM}$ signal differs to some extent from the $A_{QAM}$ signal because channel 9 causes some signal distortion and attenuation. Receiver 10 converts the $B_{QAM}$ signal back into the DATA bit sequence. The $A_{QAM}$ signal includes two modulated sinusoidal carriers 90 degrees out of phase with one another, and although the carriers occupy the same frequency band, transmitter 8 and receiver 10 can independently modulate and demodulate the two carriers. QAM system 6 can therefore transmit data at twice the rate of standard pulse amplitude modulation (PAM) system without any degradation in bit error rate.

Transmitter 8 includes a QAM mapping circuit 12 for converting the DATA bit sequence into two symbol sequences $I_n$ and $Q_n$. Root Nyquist and interpolation filters 14 pulse shape the $I_n$ and $Q_n$ symbol sequences to achieve output sequences $I'_n$ and $Q'_n$ having good spectral efficiency. A quadrature modulator (QM) 18 then quadrature modulates the output sequences $I'_n$ and $Q'_n$ of filters 14 to produce data sequences representing the two modulated carrier signals, a summer 20 sums them to form a single sequence representing $A_{QAM}$, and a digital-to-analog converter (DAC) 21 and a low pass filter 22 convert that sequence into the $A_{QAM}$ signal.

Receiver 10 includes a programmable gain amplifier (PGA) 25 for amplifying the $B_{QAM}$ signal with a gain controlled by an automatic gain control (AGC) circuit 24 to adjust the signal level to the working range of a subsequent analog-to-digital converter (ADC) 26. A low pass filter 27 filters the output of PGA 25 and an ADC 26 digitizes the output of low pass filter 27 to produce a sequence of data elements $w_n$, wherein each $n^{th}$ element $w_n$ represents the $n^{th}$ sample of the analog signal output of low pass filter 27. A quadrature demodulator (QDM) 28 then demodulates sequence $w_n$ by multiplying it by two sine wave sequences 90 degrees out of phase with one another to produce two sequences of data elements $vI_n$ and $vQ_n$. Decimation and root Nyquist filters 30 decimate and filter sequences $vI_n$ and $vQ_n$ to produce symbol sequences $rI_n$ and $rQ_n$ having the same symbol rate as the $I_n$ and $Q_n$ sequences produced by the transmitter's QAM mapping circuit 12.

A feed forward equalizer (FFE) 32 filters the $rI_n$ and $rQ_n$ sequences to remove inter symbol interference (ISI) due to distortions caused by channel 9 and to finely adjust the sampling phase of the signal, thereby producing "soft decision" symbol sequences $yI_n$ and $yQ_n$. Each symbol of the $yI_n$ and $yQ_n$ soft decision sequences has more bits than a corresponding symbol of the original $I_n$ and $Q_n$ sequences generated by the transmitter's QAM mapping circuit 12 but represents approximately the same value. A pair of slicers 34 convert the soft decision sequence into lower resolution "hard decision" sequences $aI_n$ and $aQ_n$ matching the $I_n$ and $Q_n$ symbol sequence outputs of QAM mapping circuit 12. A QAM de-mapping circuit 36 converts the $aI_n$ and $aQ_n$ symbol sequences into the output DATA sequence.

Figure 2:
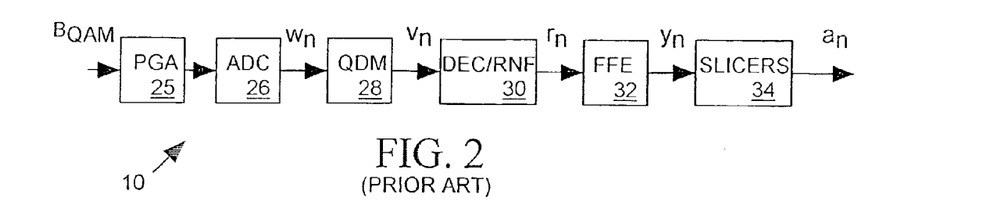
FIG. 2 illustrates the receiver of the QAM communication system of FIG. 1 in block diagram form.

FIG. 2 depicts a portion of QAM receiver 10 of FIG. 1 in a more compact form wherein sequences $vI_n$ and $vQ_n$ of FIG. 1 are represented by single complex sequence $v_n = vI_n + jvQ_n$. Similarly, $r_n = rI_n + jrQ_n$, $y_n = yI_n + jYQ_n$, and $a_n = aI_n + jaQ_n$.

Figure 3:
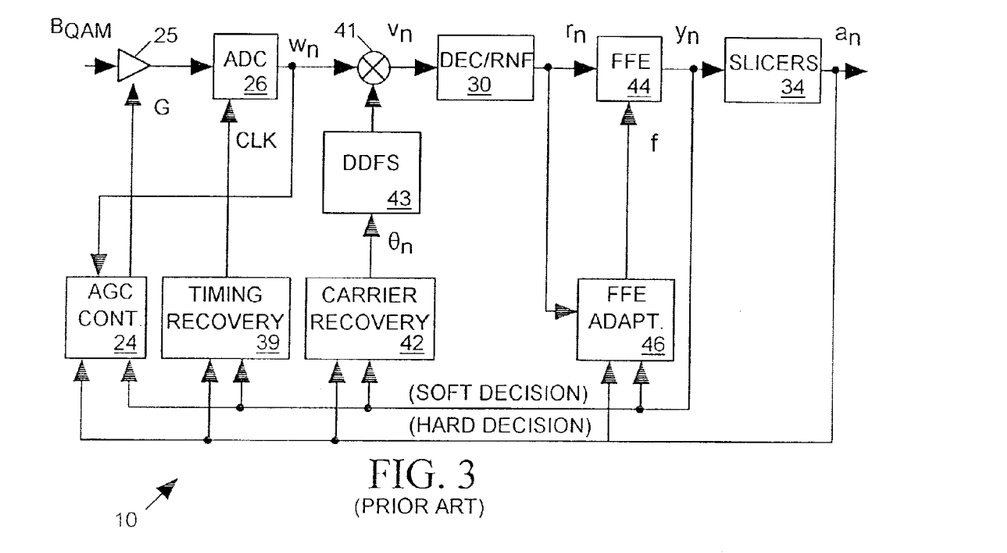
FIG. 3 illustrates the receiver of the QAM communication system of FIG. 2 in more detailed block diagram form.

FIG. 3 is a more 1 CLK produced by a timing recovery circuit 39 which adjusts the frequency of the CLK signal to as nearly as possible match the transmitter's output symbol rate.

The receiver's quadrature demodulator 28 of FIG. 2 includes a pair of multipliers 41 (only one is shown in FIG. 3) for multiplying the $w_n$ sequence by two carrier sequences produced by a direct digital frequency synthesizer (DDFS) 43 to produce complex sequence $v_n = vI_n + jQ_n$ where $vI_n = w_n[\cos(\omega t_n + \theta_n)]$, and $vQ_n = w_n[-\sin(\omega t_n + \theta_n)]$.

The carrier sequences mimic the behavior of the two carrier signals that are 90 degrees out of phase with one another. A carrier recovery system 42 supplies DDFS 43 with input data $\theta_n$ for controlling the quadrature demodulation phase angle of the carrier sequences.

Feed forward equalizer 32 of FIG. 2 includes a complex finite impulse response (FIR) filter 44 for filtering the $r_n$ sequence to produce the soft decision $y_n$ sequence. Each symbol of the $y_n$ sequence is a weighted sum of preceding and subsequent samples of the $r_n$ sequence, with weighting being determined by a set of filter coefficients f supplied as input to FIR filter 44 by an FFE adaptation circuit 46. FFE adaptation circuit 46 adjusts filter coefficients f as necessary to remove inter symbol interference (ISI) due to channel distortions and to finely adjust sampling phase.

Figure 4:
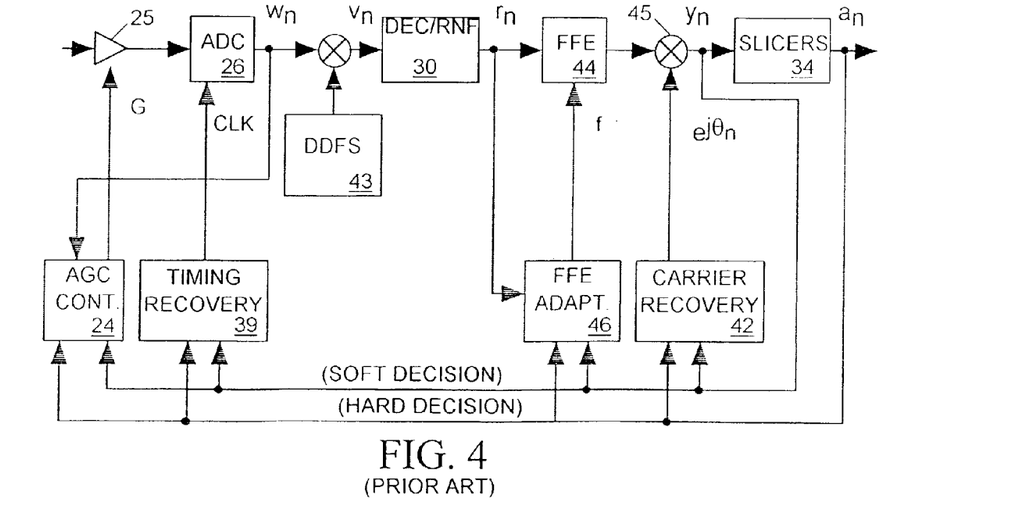
FIG. 4 illustrates another prior art QAM receiver in detailed block diagram form.

FIG. 4 depicts a version of a QAM receiver that is generally similar to that of FIG. 3 except that in FIG. 4, DDFS 43 operates with a phase angle rotating at a fixed rate, and a pair of multipliers 45 multiply the complex output sequence of FIR filter 44 by a complex sequence based on en to remove the carrier components from $y_n$.

Referring to FIG. 3, for receiver 10 to produce a hard decision sequence $a_n$ correctly representing the $I_n$ and $Q_n$ output sequences of the transmitter's QAM mapping circuit 12 (FIG. 1), all of control circuits 24, 42 and 46 must appropriately adjust their output control data values G, $\theta_n$ and f, and timing recovery circuit 39 must appropriately adjust the frequency of clock signal CLK. Control circuits 24, 42 and 46 monitor various characteristics of, or relationships between, the various symbol sequences receiver 10 produces and adapt their control data outputs so that the symbol sequences exhibit the desired characteristics or relationships. On system start up, the values of control data G, $\theta_n$ and f and the frequency of the CLK signal will be incorrect, and the complex output hard decision sequence $a_n$ will not correctly reflect the $I_n$ and $Q_n$ sequences generated by the transmitters QAM mapping circuit 12 (FIG. 1). However after receiver 10 begins to process an incoming $B_{QAM}$ signal, control circuits 24, 39, 42 and 46 adjust their outputs so that the $a_n$ sequence correctly represents the original $I_n$ and $Q_n$ sequences.

Since the goal of control circuits 24, 39, 42 and 46 is to ensure that receiver 10 produces correctly valued hard and soft decision symbols, then the control circuits can most accurately determine how to adjust their output by monitoring aspects of the hard and/or soft decision sequences $y_n$ and $a_n$. However since values of $y_n$ and $a_n$ are affected by how well each of the control circuits adjust its output, it is necessary to carefully coordinate the algorithms employed by control circuits 24, 39, 42 and 46 so that they form a stable control system in which all control outputs converge to correct values.

The various prior art algorithms that FFE adaptation circuit 46 may use when establishing values of FFE coefficients f can be classified as decision directed (DD) or non decision directed (NDD). DD algorithms are more accurate than NDD algorithms, but a DD algorithm may not converge unless values G and $\theta_n$, and the frequency of the CLK are nearly correct before the DD algorithm will be able to converge on correct FFE filter coefficient values. NDD algorithms are less accurate than DD algorithms, but some NDD algorithms can converge regardless of the value of $\theta_n$, provided that gain control data G and CLK signal frequency are nearly correct. A prior art FFE adaptation circuit 46 may initially operate in an NDD adaptation mode following system startup, employing an NDD algorithm to coarsely adjust the FFE filter coefficient values. After carrier recovery circuit 42 then coarsely adjusts $\theta_n$, the FFE adaptation circuit 46 begins operating in a DD mode, employing a DD algorithm to finely adjust the FFE filter coefficient values.

Depending on the NDD algorithm employed, the ability of FFE adaptation circuit 46 to coarsely adjust filter coefficients f can depend to some extent on how well carrier recovery circuit 42 currently estimates $\theta_n$. Conversely, the ability of carrier recovery circuit 42 to coarsely adjust $\theta_n$ depends on how well FFE adaptation circuit 46 has coarsely adjusted equalization filter coefficients f. To resolve this interdependence problem many prior art FFE adaptation circuit 46 employ a "constant modulus" algorithm (CMA) to coarsely adjust f during the NDD mode because the CMA algorithm enables the FFE adaptation circuit to coarsely adjust FFE coefficients f regardless of whether carrier recovery circuit 42 has properly adjusted $\theta_n$, provided that the magnitude of G and the CLK signal frequency are approximately correct. The following is an example of how the control circuits of prior art receiver 10 adjust G, $\theta_n$, f and CLK signal frequency:

1. AGC 25 monitors $w_n$ and coarsely adjusts G.
2. Timing recovery circuit 39 adjusts the CLK signal to a fixed frequency matching the expected symbol rate of the $V_{QAM}$ signal.
3. After AGC 25 has coarsely adjusted gain G, FFE adaptation circuit 46, employing a CMA NDD algorithm, is able to coarsely adjust FFE filter coefficients f.
4. After FFE filter coefficients f are coarsely adjusted, carrier recovery circuit 42 is able to coarsely adjust $\theta_n$.
5. With G, $\theta_n$, f and CLK coarsely adjusted, $y_n$ and $a_n$ will be nearly correct. FFE adaptation circuit 46 then begins employing a DD algorithm.
6. AGC controller 36 and timing recovery circuit 39 may begin monitoring $y_n$ and/or $a_n$ instead of $w_n$ so that they can more accurately adjust gain G and CLK signal frequency.
7. As G, f and CLK are more finely adjusted, the algorithm employed by carrier recovery circuit 42 is able to more finely adjust $\theta_n$.

One problem with using the CMA algorithm for coarse equalization adaptation is that a circuit implementing a CMA algorithm requires many expensive multipliers. A reduced constellation algorithm (RCA) requires fewer multipliers to implement, but is not reliable for use in the coarse adjustment phase because it cannot correctly adjust coefficient values until $\theta_n$ is nearly correct. What is needed is a less expensive system for providing gain, carrier recovery and equalization for a QAM receiver that does not require the use of a CMA FFE adaptation algorithm during the coarse adjustment phase.

BRIEF SUMMARY OF THE INVENTION

A quadrature amplitude modulation (QAM) receiver digitizes an analog QAM signal representing a first sequence of complex elements to produce a digital waveform sequence representing amplitudes of successive samples of the QAM signal. The QAM receiver employs a digital signal processing (DSP) circuit to process the digital waveform sequence to produce a soft decision sequence of complex elements, each of value that is a higher resolution approximation of a value of a corresponding transmitted sequence element. A pair of slicers then converts each soft decision sequence element into a lower resolution hard decision sequence element matching the corresponding complex element of the first sequence. In processing the digital waveform sequence, the DSP circuit provides quadrature demodulation with a demodulation phase angle controlled by a control data sequence $\theta_n$, provides a gain controlled by control data $g_n$, and provides equalization using a set of equalization filter coefficients, each $i^{th}$ filter coefficient being of value controlled by separate control data $f_i$.

In accordance with the invention, the DSP circuit adjusts control data sequence $\theta_n$ and control data $g_n$ and $f_i$ in accordance with separate algorithms, but the algorithms all minimize the same cost function relative to the soft and hard decision sequences. Thus even though the algorithms depend on one another for convergence, all algorithms will converge on appropriate values of $\theta_n$, $f_i$, and $g_n$ because all algorithms have complementary, rather than competing influences on the soft and hard decision sequences.

The claims appended to this specification particularly point out and distinctly claim the subject matter of the invention. However those skilled in the art will best understand both the organization and method of operation of what the applicant(s) consider to be the best mode(s) of practicing the invention, together with further advantages and objects of the invention, by reading the remaining portions of the specification in view of the accompanying drawing(s) wherein like reference characters refer to like elements.

DETAILED DESCRIPTION OF THE INVENTION

The invention relates to a quadrature amplitude modulation (QAM) receiver for processing an incoming QAM signal $B_{QAM}$ representing a first sequence of complex data elements $I_n+jQ_n$ into an output sequence of complex digital data elements an wherein each $n^{th}$ element $a_n$ of the output sequence matches a corresponding $n^{th}$ element $I_n+jQ_n$ of the transmitted sequence. While an exemplary QAM receiver described below is considered by the applicant(s) to be a best mode of implementing the invention, the invention as recited in the claims appended to this specification is not limited to the exemplary QAM receiver described below, and may be employed in connection with other QAM receiver architectures.

Figure 5:
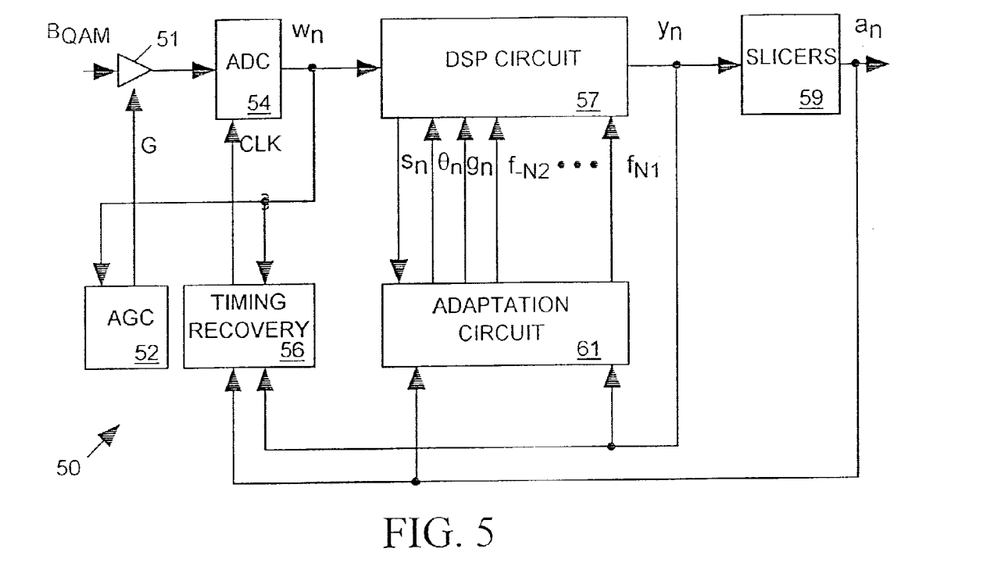
FIG. 5 illustrates an exemplary embodiment of a QAM receiver in accordance with the invention in block diagram form.

FIG. 5 depicts the example QAM receiver 50 in block diagram form. Receiver 50 includes a programmable gain amplifier (PGA) 51 for amplifying the $B_{QAM}$ signal with a gain $g_n$ controlled by an automatic gain control (AGC) circuit 52. An analog-to-digital converter (ADC 54) digitizes the output of amplifier 51 at a rate controlled by the frequency of a clock signal CLK produced by a timing recovery circuit 56 to produce a digital waveform sequence of elements $w_n$ representing successive magnitudes of the analog output of PGA 51. AGC circuit 52 employs a conventional feedback process to continuously adjust gain $g_n$ based on information obtained from the $w_n$ sequence. A digital signal processing (DSP) circuit 57 processes the $w_n$ waveform data sequence to produce a "soft decision" sequence of complex elements $y_n$, wherein each $n^{th}$ element $y_n$ is a higher resolution approximation of a corresponding complex element $I_n+jQ_n$ of the transmitted sequence. A pair of slicers 59 then slice (reduce the resolution of) each element $y_n$ to produce an output "hard decision" sequence element $a_n$ matching the corresponding element $I_n+jQ_n$. Slicers 59 employ a rounding technique to reduce the resolution of elements $y_n$ to produce elements $a_n$.

DSP circuit 57 provides quadrature modulation with a modulation phase angle controlled by a control data sequence $\theta_n$, provides a gain controlled by control data $g_n$, and provides equalization based on a set of equalization filter coefficients $f_i$, for i=−N2 to N1, where N1 and N2 are integers greater than 0.

An adaptation circuit 61 adjusts the values of $\theta_n$, $g_n$, and $f_i$ so that the hard decision elements $a_n$ correctly match the sequence of elements $I_n+jQ_n$ transmitted via $B_{QAM}$. Adaptation circuit 61 implements several algorithms, with each algorithm being designed to adjust a separate one of the adaption circuit outputs $\theta_n$, $g_n$, and $f_i$ so as to minimize a particular cost function relative to soft and hard decision sequence elements $y_n$ and $a_n$. That particular cost function is selected so that when it is minimized, the output hard decision sequence elements $a_n$ will correctly represent the transmitted sequence elements $I_n+jQ_n$. Since all algorithms minimize the same cost function, they will all converge to the correct values of $\theta_n$, $g_n$, and $f_i$ even though algorithms may depend on one another for convergence.

Figure 6A:
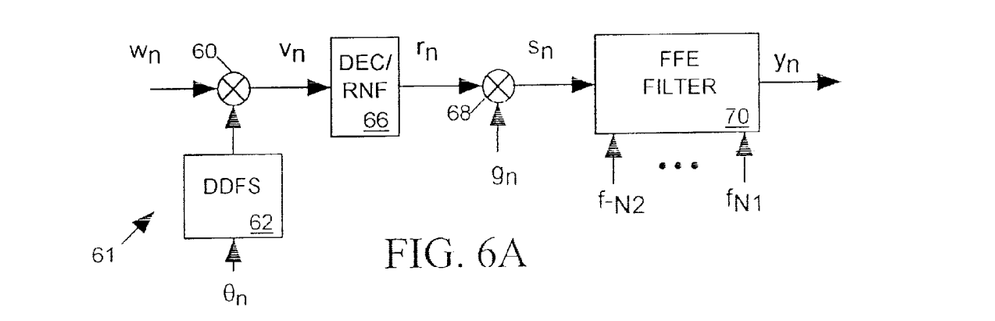
FIGS. 6A and 6B illustrate exemplary embodiments of digital signal processing (DSP) circuit of the receiver of FIG. 5 in more detailed block diagram form.
Figure 6B:
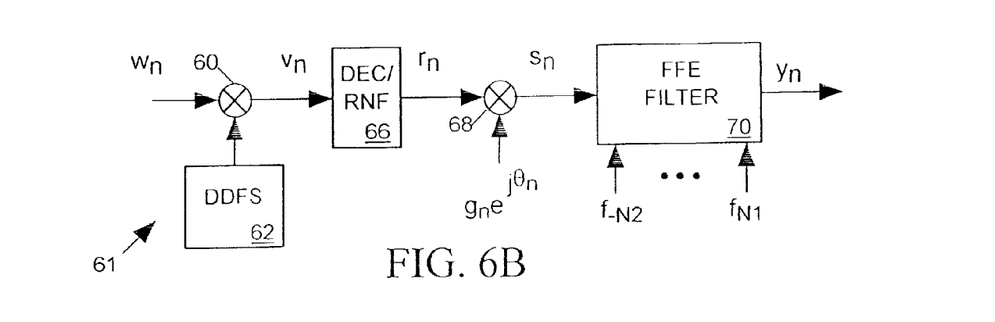

FIGS. 6A and 6B illustrate alternative examples of DSP circuit 57 of FIG. 5, though other DSP circuit architectures are possible. DSP circuit 57 of FIG. 6A includes a pair of multipliers 60 (only one is shown) for multiplying the $w_n$ sequence by a pair of sine wave sequence generated by a digital frequency synthesizer (DDFS) 62 that are 90 degrees out of phase with one another to produce a complex sequence of elements $v_n$ where $$v_n = w_n\{[\cos(\omega t_n+\theta_n)]+j[-\sin(\omega t_n+\theta_n)]\}$$

where $\omega$ is the frequency of the ADC sampling clock CLK and $t_n$ is time. Adaptation circuit 61 of FIG. 5 sets the value of phase angle $\theta_n$ as a function of $Y_n$ and $A_n$.

Conventional decimation and root Nyquist filters 66 filter and decimate the $v_n$ sequence to produce a complex sequence $r_n$ supplied as input to another pair of multipliers 68. Multipliers 68 multiply the real and imaginary components of $r_n$ by gain $g_n$ controlled by adaptation circuit 61 to generate a sequence $s_n$ supplied as input to a conventional feed forward equalizer (FFE) filter 70. FFE filter 70 filters the $s_n$ sequence using the set of filter coefficients $f_i$ supplied by adaptation circuit 61 to produce soft decision sequence $y_n$. FFE filter 70 is a finite impulse response (FIR) filter having $N_1$ precursor taps and $N_2$ post cursor taps, with each $i^{th}$ tap providing a separate FFE filter coefficient $f_i$, where $$i=\{-N_1,-N_1+1,\ldots,-1,0,1,\ldots,N_2-1,N_2\}.$$

such that $$y_n = \sum_{i=-N_1}^{N_2} f_i s_{n-i} \qquad [1]$$

where G, $g_n$, $\theta_n$, $f_i$ and CLK signal frequency are all appropriately adjusted, sequence elements $a_n$ will correctly match corresponding complex elements $I_n+jQ_n$ of the sequence represented by the incoming $B_{QAM}$ signal.

The DSP circuit of FIG. 6B is similar to that of FIG. 6A except that DDFS 62 supplies fixed sine wave sequences that are not a function of $\theta_n$ and adaptation circuit 61 supplies a gain term $ge^{-j\theta_n}$ as input to multiplier 68 that is a function of $\theta q_n$.

NDD Mode

At system start up, when $\theta_n$, and $g_n$ and $f_i$ are grossly incorrect, adaptation circuit 61 enters an initial blind, non decision directed (NDD) mode of operation where it grossly adjusts $g_n$, $\theta_n$, and FFE coefficients f by evaluating the following recursive expressions:

$$\theta_{n+1}=\theta_n+\mu_g\cdot Im[(R\cdot csign(a_n)-y_n)\cdot y_n^*][2]$$

$$g_{n+1}=g_n\cdot\{1+\mu_g\cdot Re[(R\cdot csign(a_n)-y_n)\cdot y_n^*]\} \qquad [3]$$

$$f_i^{(n+1)}=f_i^{(n)}+\mu\cdot(R\cdot csign(a_n)-y_n)\cdot s_{n+i}^* \text{ for all } i<>0, f_0=1 \qquad [4]$$

where
  $f_o$ is the center tap of FFE filter 70,
  E[x] denotes a statistical average of its argument x,
  $R=E[|Re(a_n)^2|/E[|Re|(a_n)|]$,
  $csign(a_n)=sign[Re(a_n)]+j\cdot sign[Im(a_n)]$,
  sign(x)=+1 for all x>=0,
  sign(x)=−1 for all x>0,
  Re[x] is the real component of a complex argument x,
  Im[x] is the imaginary component of a complex argument x,
  $\mu$ is a constant adaptation gradient, and
  $\mu_g=\mu/|g|^2$.

In 4-QAM systems, R=1. Although $|g|$ is a variable, the value of $\mu_g$ can be set to a constant.

Each of the above recursive expressions for $\theta_n$, $f_i$, and $g_n$ minimizes the same cost function CF where:

$$CF=E[|y_n-R\cdot csign(a_n)|^2]$$

The above expressions [2] and [3] for $\theta_n$ and $g_n$ may be obtained by first substituting the following expression for $s_n$ into cost function CF:

$$s_n = r_n \cdot g_n \cdot e^{j\theta_n} \quad [5]$$

Setting the partial derivative of the resulting cost function with respect to $g_n$ to zero and solving for $$g_n e^{j\theta_n}$$

we obtain $$g_{n+1} e^{j\theta_{n1}} = g_n e^{j\theta_n} \cdot \{1 + \mu_g \cdot (R \cdot C \text{sign}(a_n) - Y_n)) \cdot Y_n^*\} \quad [5]$$

When constant $\mu_g$ is small, the adaption expressions [2] and [3] above for $\theta_{n+1}$ and $g_{+1}$ may be derived from the real and imaginary parts, respectively, of coefficient $$\{1 + \mu_g \cdot (R \cdot C \text{sign}(a_n) - Y_n)) \cdot y_n^*\}$$

of expression [5]. Expression [4] above for $f_i$ may be obtained by substituting expression [1] above for $y_n$ into the cost function, setting the partial derivative of the resulting cost function with respect to $f_i$ to zero, and solving for $f_i$. Thus during its NDD mode of operation, adaptation circuit 61 adjusts each of parameters $\theta_n$, $f_i$, and $g_n$ so as to minimize the same cost function CF.

In evaluating the above expression [4] for each FFE filter coefficient $f_i$, adaptation circuit 61 implements a conventional reduced constellation algorithm (RCA) when adjusting FFE filter coefficients f. Although some prior art FFE adaptation circuits employ RCA, a sophisticated NDD carrier recovery circuit is needed to ensure $\theta_n$ has already been coarsely adjusted. To coarsely adjust FFE filter coefficients, prior art FFE adaptation circuit typically employ CMA algorithms because such algorithms can coarsely adjust the FFE filter coefficient even when $\theta_n$ is badly out of adjustment.

In prior art QAM receivers, the algorithms used to compute gain, phase angle and FFE filter coefficients are designed to minimize differing cost functions, so those algorithms can have conflicting influences on soft and hard decision sequence elements $y_n$ and $a_n$ that can prevent the algorithms from converging to appropriate values of $\theta_n$, $g_n$ and $f_i$ when they are interdependent. Such conflicts are resolved in the prior art, for example, by using a CMA algorithm rather than an RCA algorithm during the coarse adaptation phase because, unlike an RCA algorithm, a CMA algorithm's ability to grossly adjust the FFE filter coefficients is not affected by the value of $\theta_n$.

Nonetheless adaptation circuit 61 of FIG. 5 is able to employ RCA type algorithms to grossly adjust FFE filter coefficients $f_i$ because, in accordance with the invention, the RCA algorithms it uses to compute each filter coefficient and the algorithms it uses to adjust the values of $\theta_n$ and $g_n$ are all designed to minimize the same cost function CF as described above. Thus at any given time during the adaptation process, the algorithms for adjusting $g_n$, $\theta_n$ and $f_i$ all have complementary, rather than competing, influences on $y_n$ and $a_n$, and are therefore able to converge, despite their interdependence.

After adaptation circuit 61 has remained in the blind mode for a sufficient time to coarsely adjust $\theta_n$, $g_n$ and $f_i$ in accordance with the above recursive expressions, Adaptation circuit 61 enters and remains in a decision directed (DD) mode wherein it finely adjusts values of $\theta_n$, $g_n$ and $f_i$ suitably in accordance with the complementary algorithmic expressions:

$$\theta_{n+1} = \theta_n + \mu_g \cdot Im[(a_n - y_n) \cdot y_n^*]$$

$$g_{n+1} = g_n \cdot \{1 + \mu_g \cdot Re[(a_n - y_n) \cdot y_n^*]\}$$

$$f_i^{(n+1)} = f_i^{(n)} + \mu \cdot (a_n - y_n) \cdot s_{n+1}^* \text{ for all } i <> 0$$

$$f_0 = 1$$

Here too, each expression seeks to minimize the same cost function $$CF = E[|y_n - a_n|^2].$$

Figure 7:
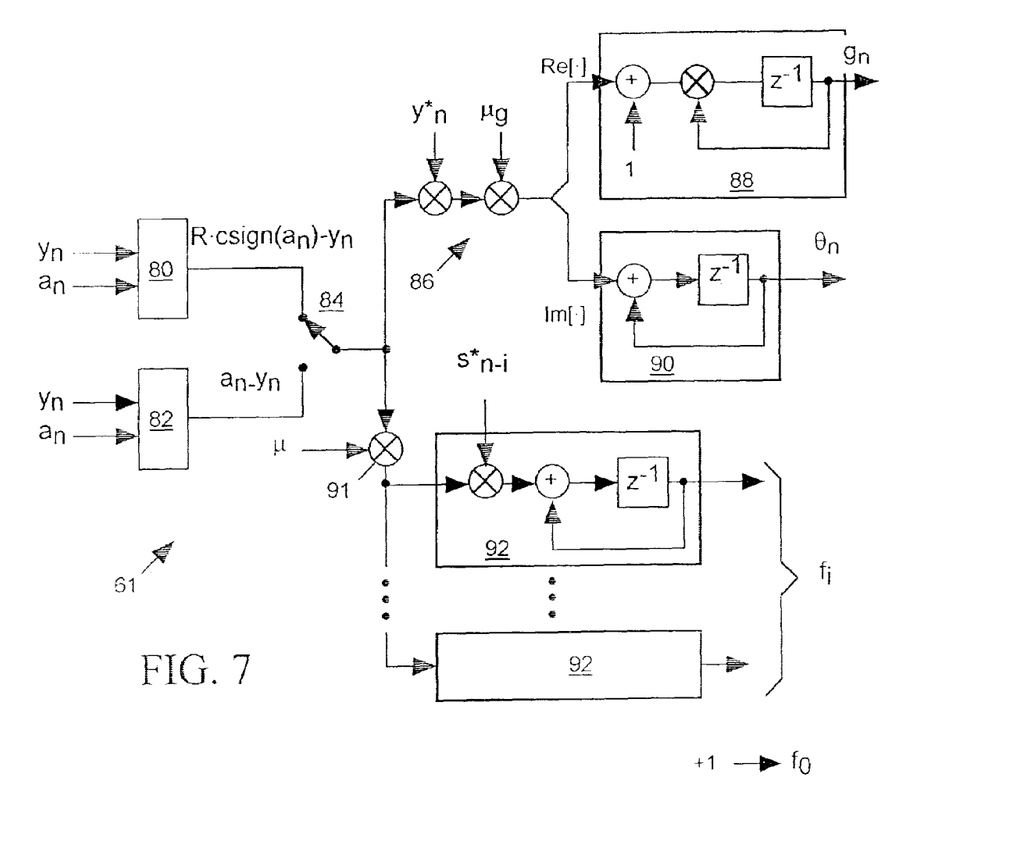
FIG. 7 illustrates an exemplary embodiment of the adaptation circuit of the receiver of FIG. 5 in more detailed block diagram form.

FIG. 7 depicts adaptation circuit 61 of FIG. 5 in more detailed block diagram form. A block of logic 80 processes the $y_n$ and $a_n$ sequences to produce the error term [R·csign $(a_n) - y_n)$] that is common to all NDD mode expressions for $g_n$, $\theta_n$ and $f_i$. Another block of logic 82 processes the $y_n$ and $a_n$ sequences to produce the error term $(a_n - y_n)$ that is common to all DD mode expressions for $q_n$, $\theta_n$ and $f_i$. A switch 84 selects the error term output of one of blocks 80 and 82 depending on the CGE circuit's current mode of operation. A pair of multipliers 86 multiply the currently selected error term by the conjugate $y_n^*$ of $y_n$ and $\mu_g$ and a pair of digital signal processing blocks 88 and 90 process the real and imaginary parts of the complex sequence output of multipliers 86 to produce control data $\theta_n$ and $g_n$. A multiplier 91 multiplies the error term selected by switch 84 by convergence gradient factor $\mu$ and a set of logic blocks 92, each corresponding to a separator one of the FFE coefficients $f_i$, process the output of multiplier 91 to produce the corresponding FFE coefficients.

As may be seen by inspection of FIG. 6, since the algorithmic expressions for calculating $g_n$, $\theta_n$ and $f_i$ are derived from the same cost function, they have many terms in common. Adaptation circuit 61 is therefore relatively inexpensive to manufacture because it is able to implement the algorithmic expressions for both NDD and DD operating modes using much logic in common.

The adaptation process carried out by receiver 50 of FIG. 5 is as follows:

1. AGC control circuit 52 employs a conventional algorithm for adjusting gain $g_n$ based on observations of $w_n$. (The total gain of the system is a function of $g_n$ and $g_n$, with gain $g_n$ providing coarse gain adjustment and gain $g_n$ providing fine gain adjustment.)
2. Timing recovery circuit 56 initially sets the CLK signal frequency to a fixed value that is approximately correct.
13. Adaptation circuit 61 initially operates in the NDD mode to coarsely adjust the quadrature demodulation phase angle $\theta_n$, gain $g_n$ and all FFE coefficients f.
4. After adaptation circuit 61 has coarsely adjusted $\theta_n$, $g_n$ and FFE coefficients f, it switches to the DD mode where it finely adjusts them.
5. When adaptation circuit 61 enters the DD mode, timing recovery circuit 56 may optionally begin employing a conventional algorithm for adjusting CLK signal frequency based on observations of $y_n$ and/or $a_n$.

The foregoing specification and the drawings depict exemplary embodiments of the best mode(s) of practicing the invention, and elements or steps of the depicted best mode(s) exemplify the elements or steps of the invention as recited in the appended claims. However other modes of practicing the invention are possible. For example the expressions adaptation circuit 61 evaluates to determine values of $\theta_n$, $g_n$ and $f_i$ may be derived from partial derivatives of any of many other cost functions such as, for example, $$CF = E[(Re(y_n)^2 - R^2)^2 + (Im(y_n)^2 - R^2)^2]$$

where $$R^2 = E[Re(a_n)^4]/E[Re(a_n)^2].$$

DSP circuit 57 of FIG. 5 may carry out its function using any of a wide variety of circuit architectures other than the exemplary DSP circuit architecture depicted in FIG. 6. For example, alternative embodiments of DSP circuit 57 may employ decision feedback equalization (DFE) in addition to feed forward equalization (FFE), though they may employ a similar adaptation circuit to control coefficients of a DFE filter. Alternative embodiments of the invention may employ interpolated timing recovery in which the CLK signal is free running. In such case an interpolation filter controlled by a conventional timing recovery circuit would, for example, be inserted into the DSP circuit between the DEC/RNF filters 66 of FIG. 6. Similarly, it should be understood that the architecture of adaptation circuit 61 depicted in FIG. 7 is only one example of a wide variety of possible adaptation circuit architectures for adaptation circuit 61. Since adaptation circuit 61 evaluates recursive control data expressions that are derived from a single cost function, and since many different cost functions are suitable, the selection of cost function from which the expressions for $\theta$, $g_n$, and $f_i$ are derived influences the architecture of the adaptation circuit.

The appended claims are therefore intended to apply to any mode of practicing the invention comprising the combination of elements or steps as described in any one of the claims, including elements or steps that are functional equivalents of the example elements or steps of the exemplary embodiment(s) of the invention depicted in the specification and drawings.

The invention claimed is:

1. An apparatus for converting a quadrature amplitude modulated (QAM) signal representing a first sequence of complex elements into a hard decision sequence of complex elements matching corresponding elements of the first sequence, the apparatus comprising:
    an analog-to-digital converter (ADC) for digitizing the QAM signal to produce a digital waveform sequence representing amplitudes of successive samples of the QAM signal;
    digital signal processing (DSP) circuit processing the digital waveform sequence to produce a soft decision sequence of complex elements, each being of value that is a higher resolution approximation of a value of a corresponding element of the first sequence, wherein the DSP circuit provides quadrature amplitude demodulation for which a quadrature demodulation phase angle is controlled by input phase angle control data, provides an adjustable gain controlled by gain control data, and provides equalization in accordance with a set of equalization filter coefficients, each controlled by separate coefficient control data;
    a slicer for converting each soft decision sequence element into a corresponding element of the hard decision sequence, each hard decision sequence element being of a value that is a lower resolution representation of a value of its corresponding hard decision sequence element; and
    an adaptation circuit evaluating a plurality of expressions having the hard and soft decision sequences as independent variables, wherein each expression computes successive values for a separate one of the phase control data, the gain control data, and the coefficient control data for each filter coefficient so as to minimize a first cost function having soft and hard sequence elements as independent variables, wherein the adaptation circuit sets the phase control data, the gain control data, and the coefficient control data for each filter coefficient to the successive values chosen by the plurality of expressions.

2. The apparatus in accordance with claim 1 wherein the expressions converge the phase control data, the gain control data, and the coefficient control data for each filter coefficient to values for which elements of the hard decision sequence match corresponding elements of the first sequence.

3. The apparatus in accordance with claim 1 wherein the separate expression for each of the phase control data, the gain control data, and the coefficient control data for each filter coefficient is a solution to an equation obtained by setting a partial derivative of the first cost function equal to zero.

4. The apparatus in accordance with claim 1 wherein the first cost function is:

$$CF = E[|y_n - R \cdot csign(a_n)|^2]$$

wherein
    E[x] denotes a statistical average of its argument x,
    $R = E[|Re(a_n)^2|/E[|Re](a_n)|]$,
    $csign(a_n) = sign[Re(a_n)] + j \cdot sign[Im(a_n)]$,
    $sign(x) = +1$ for all $x \geq 0$,
    $sign(x) = -1$ for all $x > 0$,
    Re[x] is the real component of a complex argument x,
    Im[x] is the imaginary component of a complex argument x, and wherein $y_n$ and $a_n$ are current values of corresponding pairs of the soft and hard decision sequence elements.

5. The apparatus in accordance with claim 3 wherein the plurality of expressions comprise:

$$\theta_{n+1} = \theta_n + \mu_g \cdot Im[(R \cdot csign(a_n) - y_n) \cdot y_n^*]$$

$$g_{n+1} = g_n \cdot \{1 + \mu_g \cdot Re[(R \cdot csign(a_n) - y_n) \cdot y_n^*]\}$$

$$f_i^{(n+1)} = f_i^{(n)} + \mu \cdot (R \cdot csign(a_n) - y_n) \cdot s_{n-i}^* \text{ for all } i <> 0,$$
$$f_0 = 1$$

where
    $\theta_n$ is a current value of the phase control data,
    $\theta_{n+1}$ is a next value of the phase control data,
    $g_n$ is a current value of the gain control data,
    $g_{n+1}$ is a next value of the gain control data,
    $f_i^n$ is a current value of the coefficient control data for an $i^{th}$ one of the filter coefficients,
    $f_i^{n+1}$ is a next value of the coefficient control data for the $i^{th}$ one of the filter coefficients,
    $\mu$ and $\mu_g$ are constants, and
    $s_n$ is a value of a current element of a sequence the DSP circuit generates and then equalizes to produce the soft decision sequence.

6. The apparatus in accordance with claim 1 wherein the first cost function is:

$$CF = E[|y_n - a_n|^2]$$

wherein E[x] denotes a statistical average of its argument x, and wherein $y_n$ and $a_n$ are current corresponding pairs of the soft and hard decision sequence elements.

7. The apparatus in accordance with claim 1 wherein the first cost function is:

$$CF = E[(Re(y_n)^2 - R^2)^2 = (Im(y_n)^2 - R^2)^2]$$

where $$R^2 = E[(Re(a_n))^4]/E[Re(a_n)^2]$$

wherein E[x] denotes a statistical average of its argument x, Re[x] denotes a real component of its complex argument x, Im[x] denotes an imaginary component of its complex argument x, and $y_n$ and $a_n$ are current values of corresponding pairs of the soft and hard decision sequence elements.

8. The apparatus in accordance with claim 1 wherein the DSP circuit sets the current value $y_n$ of each $n^{th}$ element of the soft decision sequence in accordance with the expression:

$$y_n = \sum_{i=-N1}^{N2} [f_i \cdot s_{n-i}]$$

where $s_{n-i}$ is an $(n-i)^{th}$ element of a sequence of complex elements the DSP circuit derives from a combination of values of elements of the digital waveform sequence, and the phase control data, the gain control data, and where $f_i$ is a value of coefficient control data for an $i^{th}$ one of the filter coefficients, and where N1 and N2 are integers greater than 0.

9. The apparatus in accordance with claim 8 wherein the first cost function is:

$$CF = E[|y_n - R \cdot csign(a_n)|^2]$$

wherein
E[x] denotes a statistical average of its argument x,
$R = E[|Re(a_n)|^2]/E[|Re|(a_n)|]$,
$csign(a_n) = sign[Re(a_n)] + j \cdot sign[Im(a_n)]$,
sign(x) = +1 for all x >= 0,
sign(x) = -1 for all x > 0,
Re[x] is the real component of a complex argument x,
Im[x] is the imaginary component of a complex argument x,
and wherein $y_n$ and $a_n$ are current values of corresponding pairs of the soft and hard decision sequence elements.

10. The apparatus in accordance with claim 9 wherein the plurality of expressions comprise:

$$\theta_{n+1} = \theta_n + \mu_g 11 \cdot Im[(R \cdot csign(a_n) - y_n) \cdot y_n^*]$$

$$g_{n+1} = g_n \cdot \{1 + \mu_g \cdot Re[(R \cdot csign(a_n) - y_n) \cdot y_n^*]\}$$

$$f_i^{(n+1)} = f_i^{(n)} + \mu \cdot (R \cdot csign a_n) - y_n) \cdot s_{n-i}^* \text{ for all } i <> 0,$$
$$f_0 = 1$$

where
$\theta_n$ is a current value of the phase control data,
$\theta_{n+1}$ is a next value of the phase control data,
$g_n$ is a current value of the gain control data,
$g_{n+1}$ is a next value of the gain control data,
$f_i^n$ is a current value of the coefficient control data for an $i^{th}$ one of the filter coefficients,
$f_i^{n+1}$ is a next value of the coefficient control data for the $i^{th}$ one of the filter coefficients, and
$\mu$ and $\mu_g$ are constants.

11. A method for converting a quadrature amplitude modulated (QAM) signal representing a first sequence of complex elements into a hard decision sequence of complex elements matching corresponding elements of the first sequence, the method comprising the steps of:

a. digitizing the (QAM) signal to produce a digital waveform sequence representing amplitudes of successive samples of the QAM signal;

b. processing the digital waveform sequence to produce a soft decision sequence of complex elements, each being an approximation of a corresponding element of the first sequence, the processing including providing quadrature amplitude demodulation for which a quadrature demodulation phase angle is controlled by input phase angle control data, providing an adjustable gain controlled by gain control data, and providing equalization in accordance with a set of equalization filter coefficients, each of value controlled by separate coefficient control data;

c. converting each soft decision sequence element into a corresponding element of the hard decision sequence, wherein each hard decision sequence element is a lower resolution representation of its corresponding hard decision sequence element; and d. evaluating a plurality of expressions, each choosing successive values for a separate one of the phase control data, the gain control data, and the coefficient control data for each filter coefficient so as to minimize a first cost function having soft and hard sequence elements as independent variables; and e. setting the phase control data, the gain control data, and the coefficient control data for each filter coefficient to the successive values chosen by the plurality of expressions.

12. The method in accordance with claim 11 wherein the phase control data, the gain control data, and the coefficient control data for each filter coefficient converge to values for which elements of the hard decision sequence match corresponding elements of the first sequence.

13. The method in accordance with claim 11 wherein the separate expression for each of the phase control data, the gain control data, and the coefficient control data for each filter coefficient is a solution to an equation obtained by setting a partial derivative of the first cost function with respect to the control data equal to zero and solving for the control data.

14. The method in accordance with claim 11 wherein the first cost function is:

$$CF = E[|y_n - R \cdot csign(a_n)|^2]$$

wherein
E[x] denotes a statistical average of its argument x,
$R = E[|Re(a_n)|^2]/E[|Re|(a_n)|]$,
$csign(a_n) = sign[Re(a_n)] + j \cdot sign[Im(a_n)]$,
sign(x) = +1 for all x >= 0,
sign(x) = -1 for all x > 0,
Re[x] is the real component of a complex argument x,
Im[x] is the imaginary component of a complex argument x,
and wherein $y_n$ and $a_n$ are current values of corresponding pairs of the soft and hard decision sequence elements.

15. The method in accordance with claim 13 wherein the plurality of expressions comprises:

$$\theta_{n+1} = \theta_n + \mu_g \cdot Im[(R \cdot csign(a_n) - y_n) \cdot y_n^*]$$

$$g_{n+1} = g_n \cdot \{1 + \mu_g \cdot Re[(R \cdot csign(a_n) - y_n) \cdot y_n^*]\}$$

$$f_i^{(n+1)} = f_i^{(n)} + \mu \cdot (R \cdot csign a_n) - y_n) \cdot s_{n-i}^* \text{ for all } i <> 0,$$
$$f_0 = 1$$

where
$\theta_n$ is a current value of the phase control data,
$\theta_{n+1}$ is a next value of the phase control data,
$g_n$ is a current value of the gain control data,
$g_{n+1}$ is a next value of the gain control data, $f_i^n$ is a current value of the coefficient control data for an $i^{th}$ one of the filter coefficients, $f_i^{n+1}$ is a next value of the coefficient control data for the $i^{th}$ one of the filter coefficients, $\mu$ and $\mu_g$ are constants, and $s_n$ is a value of a current element of a sequence the DSP circuit generates and then equalizes to produce the soft decision sequence.

16. The method in accordance with claim 11 wherein the first cost function is:

$$CF=E[|y_n-a_n|^2]$$

wherein Fixdenotes a statistical average of its argument x, and wherein $y_n$ and $a_n$ are current corresponding pairs of the soft and hard decision sequence elements.

17. The method in accordance with claim 11 wherein the first cost function is:

$$CF=E[(Re(y_n)^2-R^2)^2+(Im(y_n)^2-R^2)^2]$$

where $$R^2=E[(Re(a_n)^4]/E[Re(a_n)^2]$$

wherein E[x] denotes a statistical average of its argument x, Re[x] denotes a real component of its complex argument x, Im[x] denotes an imaginary component of its complex argument x, and $y_n$ and $a_n$ are current values of corresponding pairs of the soft and hard decision sequence elements.

18. The method in accordance with claim 11 wherein the DSP circuit set the current value $y_n$ of each $n^{th}$ element of the soft decision sequence in accordance with the expression:

$$y_n = \sum_{i=-N1}^{N2} [f_i \cdot s_{n-i}]$$

where $s_{n-i}$ is an $(n-i)^{th}$ element of a sequence of complex elements the DSP circuit derives from a combination of values of elements of the digital waveform sequence, and the phase control data, the gain control data, and where $f_1$ is a value of coefficients control data for an ith one of the filter coefficients, where N1 and N2 are integers greater than 0.

19. The method in accordance with claim 18 wherein the first cost function is:

$$CF=E[|y_n-R \cdot csign(a_n)|^2]$$

wherein

E[x] denotes a statistical average of its argument x, $R=E[|Re(a_n)|^2]/E[|Re(a_n)|]$, $csign(a_n)=sign[Re(a_n)]+j \cdot sign[Im(a_n)]$, $sign(x)=+1$ for all $x>=0$, $sign(x)=-1$ for all $x>0$, Re[x] is the real component of a complex argument x, Im[x] is the imaginary component of a complex argument x, and wherein $y_n$ and $a_n$ are current values of corresponding pairs of the soft and hard decision sequence elements.

20. The method in accordance with claim 19 wherein the plurality of expressions comprises:

$$\theta_{n+1}=\theta_n+\mu_g \cdot Im[(R \cdot csign(a_n)-y_n) \cdot y_n^*]$$

$$g_{n+1}=g_n \cdot \{1+\mu_g \cdot Re[(R \cdot csign(a_n)-y_n) \cdot y_n^*]\}$$

$$f_i^{(n+1)}=f_i^{(n)}+\mu \cdot (R \cdot csign\, a_n)-y_n) \cdot s_{n-i}^{-*} \text{ for all } i<>0,$$
$$f_0=1$$

where $\theta_n$ is a current value of the phase control data, $\theta_{n+1}$ is a next value of the phase control data, $g_n$ is a current value of the gain control data, $g_{n+1}$ is a next value of the gain control data, $f_i^n$ is a current value of the coefficient control data for an $i^{th}$ one of the filter coefficients, $f_i^{n+1}$ is a next value of the coefficient control data for the $i^{th}$ one of the filter coefficients, $\mu$ and $\mu_g$ are constants.

21. An apparatus for converting a quadrature amplitude modulated (QAN) signal into a sequence of complex hard decisions, the apparatus comprising:

an analog-to-digital converter (ADC) for digitizing the QAM signal to produce an input sequence of complex samples;

a digital signal processing (DSP) circuit processing the input sequence of complex samples to produce a sequence of complex soft decisions according to phase control data, gain control data, and a set of filter coefficient control data of the DSP circuit;

a slicer for converting each element of the complex soft decision sequence into a corresponding element of the complex hard decision sequence; and an adaptation circuit for determining the phase control data, the gain control data, and the filter coefficient control data according to the hard and soft decision sequences.

22. The apparatus of claim 21, wherein the DSP circuit further comprises:

a quadrature demodulator controlled by the phase control data;

a gain block controlled by the gain control data; and an equalizer controlled by the set of filter coefficient control data.

23. The apparatus of claim 22, wherein the quadrature demodulator further comprises a multiplier, wherein the multiplication factor is a phasor, of which the phase is determined by the phase control data.

24. The apparatus of claim 22, wherein the gain block further comprises a multiplier, wherein the multiplication factor is determined by the gain control data.

25. The apparatus of claim 22, wherein the equalizer further comprises a complex digital filter, the coefficients of which are controlled by the set of filter coefficient control data.

26. The apparatus of claim 21, wherein the adaptation circuit determine values of the phase control data, the gain control data, and the filter coefficient control data so as to minimize the element-wise differences between the sequence of complex hard decisions and the sequence of complex soft decisions.

27. A method for converting a quadrature amplitude modulated (QAM) signal into a sequence of complex hard decisions, the method comprising the steps of:

digitizing the QAM signal to produce an input sequence of complex samples;

processing the input sequence of complex samples to produce a sequence of complex soft decisions according to phase control data, gain control data, and a set of filter coefficient control data of a digital signal processing (DSP) circuit;

converting each element of the sequence of soft decisions into a corresponding element of the complex hard decision sequence; and estimating the phase control data, the gain control data, and the filter coefficient control data according to the hard and soft decision sequences; and setting the phase control data, the gain control data, and the filter coefficient control data to the DSP circuit.

28. The method of claim 27, wherein estimating the phase control data, the gain control data, and the filter coefficient control data further comprises determining their values to minimize the element-wise differences between the sequence of the complex hard decisions and the sequence of complex soft decisions.

29. The method of claim 27, the step of processing further comprising:
   providing a quadrature amplitude demodulation according to the phase control data;
   providing a gain according to the gain control data; and
   providing an equalization according to the set of filter coefficient control data.

30. The method of claim 29, wherein the method of providing a quadrature demodulation further comprises adjusting the phase by multiplying with a phasor, the phase of which is determined by the phase control data.

31. The method of claim 29, wherein the method of providing a gain further comprises multiplying with a factor determined by the gain control data.

32. The method of claim 29, wherein the method of providing an equalization further comprises performing a filtering using a digital filter, the coefficients of which are determined by the set of filter coefficient control data.

* * * * *

UNITED STATES PATENT AND TRADEMARK OFFICE
CERTIFICATE OF CORRECTION

PATENT NO. : 7,085,328 B2  
APPLICATION NO. : 10/328504  
DATED : August 1, 2006  
INVENTOR(S) : Chia-Liang Lin and Wen-Juh Kang It is certified that error appears in the above-identified patent and that said Letters Patent is hereby corrected as shown below:

Column 10,

Line 25, "$R = E [ | Re(a_n)^2 | /E | [Re](a_n) | ]$," should be
--$R = E [ | Re(a_n)^2 | ] /E [ | Re(a_n) | ]$, -- .

Line 28, " $sign(x) = -1$ for all $x > 0$," should be --$sign(x) = -1$ for all $x < 0$, -- .

Line 30, "the real component" should be --a real component-- .

Line 31, "the imaginary component" should be --an imaginary component--.

Line 43, "$f_i^{(n+1)} = f_i^{(n)} + \mu \cdot (R \cdot csign(a_n) - y_n) \cdot s_{n-i}^*$ for all $i <> 0$, $f_0 = 1$" should be -- $f_i^{(n+1)} = f_i^{(n)} + \mu \cdot (R \cdot csign(a_n) - y_n) \cdot s_{n-i}^*$ for all $i <> 0$, $f_0 = 1$-- .

Line 60, "$CF = E [ | y_n - a_n) |^{2]}$" should be -- $CF = E [ | y_n - a_n) |^2 ]$ -- .

Line 66, "$CF = E [ (Re(y_n)^2 - R^2)^2 = (Im(y_n)^2 - R^2)^2 ]$" should be -- $CF = E [ (Re(y_n)^2 - R^2)^2 + (Im(y_n)^2 - R^2)^2 ]$ -- .

Column 11,

Line 2, "$R^2 = E [ (Re(a_n)^4 ] / E [Re(a_n)^2 ]$" should be
-- $R^2 = E [Re(a_n)^4 ] / E [Re(a_n)^2 ]$ -- .

Line 32, "$R = E [ | Re(a_n)^2 | / E [ | Re ](a_n) | ]$," should be
-- $R = E [ | Re(a_n)^2 | ] / E [ | Re(a_n) | ]$, -- .

Line 33, "$csign(a_n) = sign[Re(a_n] + j \cdot sign[Im(a_n) ]$, " should be
-- $csign(a_n) = sign[Re(a_n) + j \cdot sign(Im(a_n) ]$, -- .

Line 35, "$sign(x) = -1$ for all $x > 0$," should be -- $sign(x) = -1$ for all $x < 0$, -- .

Line 36, "the real component" should be --a real component--.

Line 37, "the imaginary component" should be --an imaginary component--.

Line 47, "$f_i^{(n+1)} = f_i^{(n)} + \mu \cdot (R \cdot csign a_n) - y_n) \cdot s_{n-i}^*$ for all $i <> 0$, $f_0 = 1$" should be -- $f_i^{(n+1)} = f_i^{(n)} + \mu \cdot (R \cdot csign(a_n) - y_n) \cdot s_{n-i}^*$ for all $i <> 0$, $f_0 = 1$-- .

UNITED STATES PATENT AND TRADEMARK OFFICE
CERTIFICATE OF CORRECTION

PATENT NO. : 7,085,328 B2
APPLICATION NO. : 10/328504
DATED : August 1, 2006
INVENTOR(S) : Chia-Liang Lin and Wen-Juh Kang It is certified that error appears in the above-identified patent and that said Letters Patent is hereby corrected as shown below:

Column 11 (cont'd),

Line 57, "$f_i^{n+1}$" should be --$f_i^{(n+1)}$-- . (Preliminary Amendment filed July 7, 2003, amended claim 10) .

Column 12,

Line 45, "$R = E [ | Re (a_n)^2 | / E [ | Re ] (a_n) | ]$ , " should be
-- $R = E [ | Re (a_n)^2 | ] / E [ | Re (a_n) | ]$ , --.

Line 57, "$\theta_{n+1 = \theta n} + \mu_g \cdot Im [ (R \cdot csign (a_n) - y_n) \cdot y_n^* ]$ " should be -- $\theta_{n+1} = \theta_n + \mu_g \cdot Im [ (R \cdot csign (a_n) - y_n) \cdot y_n^* ]$ -- .

Line 61, "$f_i^{(n+1)} = f_i^{(n)} + \mu \cdot (R \cdot csign a_n) - y_n) \cdot s_{n-i}^*$ for all i <> 0, $f_0 = 1$" should be
-- $f_i^{(n+1)} = f_i^{(n)} + \mu \cdot (R \cdot csign (a_n) - y_n) \cdot s_{n-i}^*$ for all i <> 0, $f_0 = 1$-- .

Column 13,

Line 3, "$f_i^{n+1}$" should be --$f_i^{(n+1)}$-- .

Line 13, "Fixdenotes" should be --E [x] denotes--.

Line 18, "$CF = E [ (Re (y_n)^2 - R^2)^2 + (Im (y_n)^2 - R^2)^2 ]$" should be --$CF = E [ (Re (y_n)^2 - R^2)^2 + (Im (y_n)^2 - R^2)^2$ -- .

Line 22, "$R^2 = E [ (Re (a_n)^4 ] / E [Re (a_n)^2 ]$ " should be
-- $R^2 = E [Re (a_n)^4 ] / E [Re (a_n)^2 ]$ -- .

Line 48, "$R = E [ | Re (a_n)^2 | / E [ | Re (a_n) | ]$ , " should be
-- $R = E [ | Re (a_n)^2 | ] / E [ | Re (a_n) | ]$ --.

Line 49, "$csign (a_n) = sign [Re (a_n] + j \cdot sign [Im (a_n) ]$ , " should be
-- $csign (a_n) = sign [Re (a_n) + j \cdot sign (Im (a_n) ]$ , -- .

Line 51, "sign (x) = - 1 for all x > 0," should be --sign (x) = - 1 for all x < 0,--.

Line 52, "the real component" should be --a real component-- (Claim 19 as originally filed) .

UNITED STATES PATENT AND TRADEMARK OFFICE
CERTIFICATE OF CORRECTION

PATENT NO. : 7,085,328 B2
APPLICATION NO. : 10/328504
DATED : August 1, 2006
INVENTOR(S) : Chia-Liang Lin and Wen-Juh Kang It is certified that error appears in the above-identified patent and that said Letters Patent is hereby corrected as shown below:

Column 13 (cont'd),

Line 53, "the imaginary component" should be --an imaginary component--.

Line 62, "$f_i^{(n+1)} = f_i^{(n)} + \mu \cdot (R \cdot csigna_n) - y_n) \cdot s_{n-i}^*$ for all i < > 0, $f_0 = 1$" should be

-- $f_i^{(n+1)} = f_i^{(n)} + \mu \cdot (R \cdot csign(a_n) - y_n) \cdot s_{n-i}^*$ for all i < > 0, $f_0 = 1$ -- .

Column 14,

Line 9, " (QAN) " should be -- (QAM) -- .

Signed and Sealed this

Fifth Day of June, 2007

JON W. DUDAS
*Director of the United States Patent and Trademark Office*